F. J. HICKS.
TRACTOR.
APPLICATION FILED APR. 12, 1919.

1,367,317.

Patented Feb. 1, 1921.
2 SHEETS—SHEET 1.

FRANK J. HICKS
INVENTOR

BY Richey & Adam

HIS ATTORNEYS

FRANK J. HICKS
INVENTOR

UNITED STATES PATENT OFFICE.

FRANK J. HICKS, OF ELYRIA, OHIO, ASSIGNOR TO THE HICKS TRACTOR COMPANY, OF ELYRIA, OHIO, A CORPORATION OF OHIO.

TRACTOR.

1,367,317. Specification of Letters Patent. Patented Feb. 1, 1921.

Application filed April 12, 1919. Serial No. 289,642.

*To all whom it may concern:*

Be it known that I, FRANK J. HICKS, a citizen of the United States, residing at Elyria, in the county of Lorain and State of Ohio, have invented certain new and useful Improvements in Tractors; and I do hereby declare the following to be a full, clear, and exact description of the invention, such as will enable others skilled in the art to which it appertains to make and use the same.

This invention relates to tractors, and it is one of the objects to produce a type of tractor that occupies minimum space and combines simplicity of construction with maximum tractive effort. More specific objects will appear in the following description, reference being had to the drawings, in which—

Figure 1:
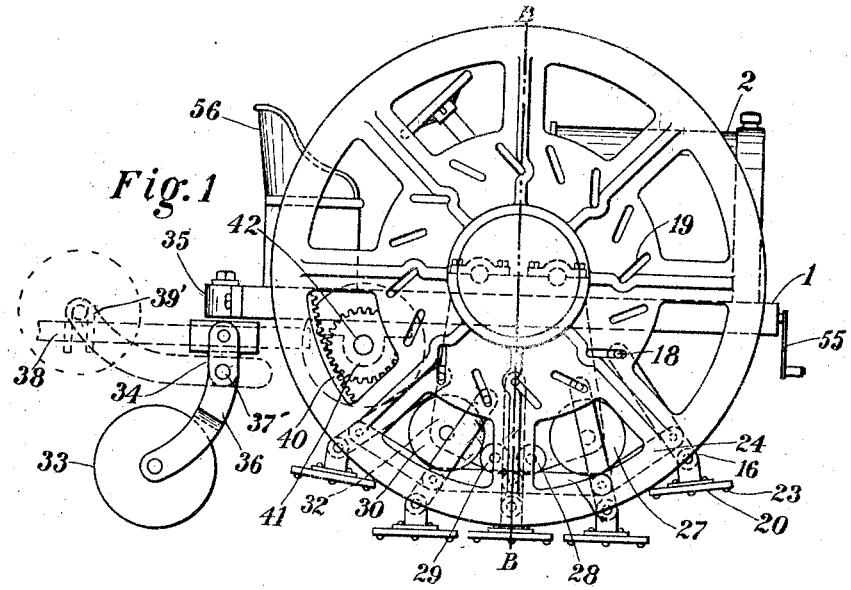
Figure 1 is an elevation of the tractor.
Figure 2:
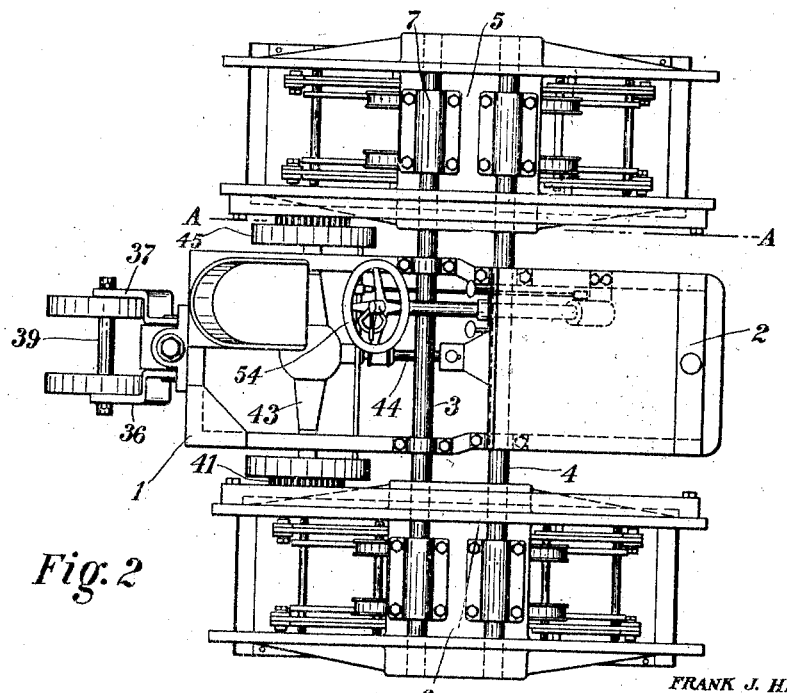
Fig. 2 is a plan view of the tractor shown in Fig. 1.

Referring to the drawings, my improved tractor consists of a suitable frame portion 1, carrying an engine 2 of any desired type. The frame is suspended or secured to the transverse rods or beams 3 and 4 by any suitable means, and the rods are secured at their ends in bearing members 5 and 6 through devices, such as clamps 7. The bearing members 5 on each side have raceways or bearing surfaces 8 and 9 adapted to coöperate with the bearing members 10 and 11 on tractor wheel frames 12 and 13. Various bearing arrangements may be provided, but I have shown rollers 14 between the members 8 and 10 and 9 and 11.

The wheel members 12 and 13 are recessed to receive retaining caps 15, which are held to the bearing member 5 by suitable screws. A loose fit is maintained between the circular caps 15 and the wheel members 12 and 13, so that there will be no contact between them. Each of the main drive wheels of the tractor has a plurality of links or levers 16, 17 secured thereto by suitable bolts 18 working in slots 19 in the wheel members. The outer end of each pair of coöperating links 16, 17 is pivotally secured in a shoe or ground-gripping member 20, by means of a cross rod 21, which passes through ears 22 on the member 20 and through the end of the link 16. If desired, the bottom portion of the member 20 may be provided with suitable cross bars, such as 23, to give firm gripping action with the ground. However, the bottom surface of the member 20 may be made smooth, or of any other character, depending upon circumstances. Each pair of links 16 and 17 is connected by tie bars 24 and cross rods 23′ with adjacent pairs of links, in such a way that all of the links 16 and 17 around the entire wheel are connected together near their outer ends by bars 24.

Figure 3:
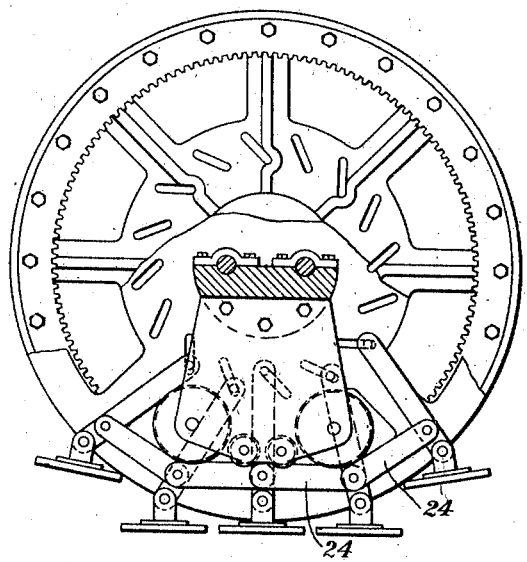
Fig. 3 is a view of a section taken along the lines A—A of Fig. 2.
Figure 4:
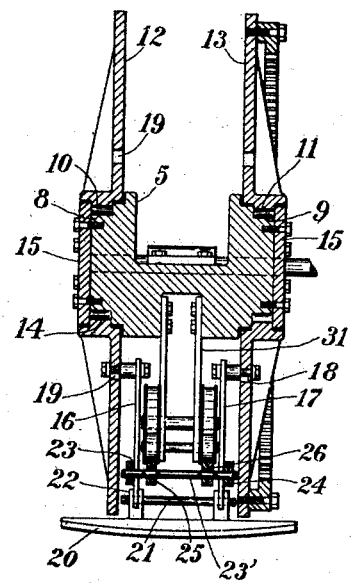
Fig. 4 is a section taken along the line B—B of Fig. 1.
Figure 5:
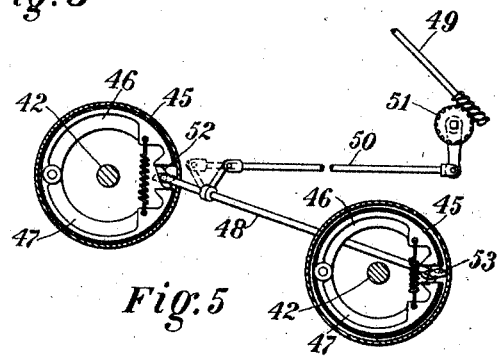
Fig. 5 is a perspective view of a portion of the steering apparatus.

While I have shown only five pairs of links 16, 17 in Figs. 1 and 3, it will be understood that the entire wheel is supplied with these. In the drawing I have provided sixteen pairs of slots 19 to accommodate sixteen ground-gripping devices, but it will be understood that any number greater or less than this may be used, when desired. The cross rod 23′ also carries rails 25, 26, so that all of the pairs of links 16, 17 around the wheel are joined together by rails or bars capable of receiving the entire weight of the machine which is transmitted to them through suitable rollers 27, 28, 29 and 30, the rollers 28 and 29 being shown of reduced size to permit closer spacing. These rollers are secured to supporting members 31 and 32, which may be made integral with the bearing member 5, or secured thereto by means of appropriate screws.

The tractor is preferably arranged in regard to the position of cross rods 3 and 4, so that the weight normally tends to rotate the left-hand end of the engine downwardly, as shown in Fig. 1. To maintain the engine in stable position, suitable trailer wheels 33 may be arranged in frame 34, adapted to swivel or rotate in the bearing member 35 on the engine frame, as shown. I also pivot the side members 36, 37 to the swivel frame 34 by means of a suitable pin or rod 37′ to permit the raising of the trailer wheels to the position shown in dotted lines for the insertion of a drag bar 38, which may connect the tractor to certain types of devices being hauled thereby. For this purpose, the drag bar 38 may be passed under the pin 39 of the trailer wheels to hold them in elevated position. The drag bar may have any means for securing it to the engine frame, such as a U bolt 39′ fitting over pin 39, for instance. It will be apparent that the drag bar prevents the tractor from rocking about the main axis, so that the trailer wheels may be raised out of operative position, as shown in dotted lines.

The wheel members 12 and 13 on each side of the tractor are caused to rotate by means of suitable gear arrangement 40, 41 on the members 13 and the drive axle 42, respectively. The axle 42 may be inclosed in a suitable axle housing 43, and may be connected to the propeller shaft 44 of the engine by a suitable differential, as will be well understood. The details of the engine drive, *per se*, form no part of this invention, and, therefore, they need not be referred to in detail.

The rear axle 42 of the tractor is secured to a suitable brake-drum 45 adapted to coöperate with any desired form of brake, such as non-revoluble shoes 46, 47, to brake and retard the rotation of the axles. The retarding of the axles is not for the purpose of slowing down the movement of the tractor, but is for the purpose of steering. I arranged to brake either one axle or the other, so as to retard the movement of either wheel, which will, therefore, at the same time, cause the speeding up of the opposite wheel through the differential connection, as is well known, and this will produce different speeds of rotation of the side wheels. This necessarily will produce the turning of the tractor in one direction or the other, depending upon which wheel is caused to rotate faster than the other.

I produce the novel form of steering by means of a brake axle 48 connected up to a hand-controlled device, such as a steering shaft 49, by means of a suitable link 50 and worm and gear arrangement 51. The braking axle 48 has oppositely positioned cams 52, 53, so that when the steering wheel 54 is rotated in one direction, one of the brakes, say that on the left, is put into action by means of the cam 52, while the other brake is unapplied. By an opposite rotation of the steering wheel 54, the right-hand brake would be applied by the cam 53 and the left-hand brake would be out of action. Therefore, by rotating the steering wheel either to the right or to the left, the tractor may be caused to move to the right or to the left by means of the braking action.

In the operation of my improved tractor the engine may be started by the usual crank 55, or by any other means, and the driver, who may sit in a seat 56, will manipulate the gas and spark levers in the usual way, and steer the tractor to the right or the left by the manipulation of the steering wheel 54. As the wheels rotate, the ground shoes 20 come successively into contact with the ground and as soon as this takes place, the bars 25 and 26 pass under the rollers 27 to 30, inclusive and the weight of the tractor is transmitted to the ground through the shoes 20, the supporting links 16, 17, cross pins 23′, bars 25, 26 and the rollers referred to through the supporting frames 32 and 31 connected to the bearing members 5. It will thus be seen that the wheel members 12 and 13 do not contact with the ground.

It is desirable to have a plurality of shoe members 20 in contact with the ground at the same time, and I, therefore, provide for the movement of the upper end of the links 16 and 17 with respect to the wheel members 12 and 13. This is produced by means of the slots 19, which coöperate with the pins 18 in such a way that the weight of the tractor brought to bear on the links 16 and 17 as they approach the center line B—B of Fig. 1 tends to force the pins 18 toward the inside end of slots 19. This consequently permits the foremost shoe 20 to gradually approach the circumference of the wheel members 12 and 13 until finally in the center position the pin has traveled to the inner end of the slot. As the shoe travels to the rear with respect to the tractor, the weight of the latter tends to force the inner end of links 16 and 17 outwardly, so that the pins 18 travel to the outer end of the slots. The shoes, therefore, are permitted to remain in contact with the ground during the time the pins 18 travel from the outer end of the slot 19 toward the inner end and back again to the outer end. This provides for the contact of at least three shoes with the ground during any one instant. Obviously by suitable arrangement of parts any number greater or less than this could be arranged to contact with the ground at any one instant.

Figure 6:
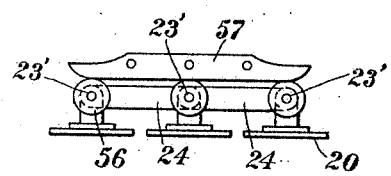
Fig. 6 is a view of a modified form of support.

Instead of having the wheels on the frame members 31 and 32, I may provide a reverse arrangement, as is shown in Fig. 6. In this figure I have placed the wheels 56 on pins 23′, and the bar 57 on the frame members 32. The details of this modification will be apparent without further illustration or description than given in connection with Fig. 6.

It will be apparent that my improved form of tractor wheel may be used on other forms of tractors than that specifically disclosed herein, and that I may use various forms of steering devices other than that illustrated and described. Also, I may use the specific form of steering device without combining it with the form of tractor wheel disclosed in this application, as it is capable of use with many other forms of wheels. It will further be apparent that many modifications may be made in the improvement, and my invention is not to be limited to the exact form disclosed.

Having described my invention, what I claim is:

1. In automotive tractors, a chassis, drive wheel members on each side of the chassis, a plurality of links having a sliding connection with said members, shoes pivoted to the links, supporting standards extending from the chassis toward the bottom of each wheel member and roller bearing means between the standards and said shoes to carry the weight of the tractor and to maintain a plurality of shoes substantially in the same plane and in contact with the ground.

2. In automotive tractors, a chassis, drive wheel members on each side of said chassis, a plurality of shoes, links pivoted to the shoes at one end and at the other end having pins adapted to slide in grooves in the wheel members, tie-bars joining all the links together circumferentially of the wheel members, supporting standards on the chassis and roller bearing means between the standards and the shoes to transmit the weight of the tractor to said shoes.

3. In automotive tractors, a chassis, drive wheel members on each side of said chassis, a plurality of shoes, links pivoted to the shoes at one end and at the other end having pins adapted to slide in grooves in the wheel members, tie-bars joining all the wheels together circumferentially of the wheel members, supporting standards on the chassis, rollers on said standards, rails secured to said shoes and adapted to come in contact with said rollers when the shoes come in contact with the ground.

In witness whereof I have hereunto signed my name this 10 day of April, 1919.

FRANK J. HICKS.